US009961704B2

(12) United States Patent
Xu et al.

(10) Patent No.: US 9,961,704 B2
(45) Date of Patent: May 1, 2018

(54) WIRELESS COMMUNICATION DEVICE, WIRELESS COMMUNICATION METHOD AND BASE STATION

(71) Applicant: SONY CORPORATION, Tokyo (JP)

(72) Inventors: Xiaodong Xu, Beijing (CN); Chengcheng Yang, Beijing (CN); Danting Zhang, Beijing (CN); Zhongbin Qin, Beijing (CN)

(73) Assignee: SONY CORPORATION, Tokyo (JP)

( * ) Notice: Subject to any disclaimer, the term of this patent is extended or adjusted under 35 U.S.C. 154(b) by 59 days.

(21) Appl. No.: 14/892,514

(22) PCT Filed: Jun. 9, 2014

(86) PCT No.: PCT/CN2014/079452
§ 371 (c)(1),
(2) Date: Nov. 19, 2015

(87) PCT Pub. No.: WO2014/198205
PCT Pub. Date: Dec. 18, 2014

(65) Prior Publication Data
US 2016/0100442 A1 Apr. 7, 2016

(30) Foreign Application Priority Data
Jun. 9, 2013 (CN) .......................... 2013 1 0231509

(51) Int. Cl.
*H04W 72/04* (2009.01)
*H04W 76/02* (2009.01)
(Continued)

(52) U.S. Cl.
CPC ....... *H04W 76/023* (2013.01); *H04W 68/005* (2013.01); *H04W 72/0453* (2013.01); *H04W 92/18* (2013.01)

(58) Field of Classification Search
CPC .......... H04W 76/023; H04W 72/0453; H04W 92/18; H04W 76/02; H04W 72/04
See application file for complete search history.

(56) References Cited

U.S. PATENT DOCUMENTS

2013/0143563 A1* 6/2013 Singh .................... H04W 68/02
455/436
2013/0223356 A1* 8/2013 Khoshnevis ........ H04W 72/042
370/329
(Continued)

FOREIGN PATENT DOCUMENTS

| CN | 102958066 A | 3/2013 |
| CN | 103024924 A | 4/2013 |
| CN | 103096290 A | 5/2013 |

OTHER PUBLICATIONS

International Search Report dated Sep. 24, 2014 in PCT/CN14/79452 Filed Jun. 9, 2014.

*Primary Examiner* — Andrew Lee
(74) *Attorney, Agent, or Firm* — Oblon, McClelland, Maier & Neustadt, L.L.P.

(57) ABSTRACT

A wireless communication device, a wireless communication method, and a base station, the wireless communication device being used for device-to-device communication and including: a reception device, used for receiving paging signaling sent when in communication with another wireless communication device and preset conditions are satisfied for device-to-device communication, the paging signaling being used to supplement paging between the wireless communication device and the other wireless-communication device; paging based upon the paging signaling is used to confirm establishment of device-to-device communication between the wireless communication device and the other wireless-communication device. The wireless communication device, wireless communication method, and base station at least (Continued)

can enhance efficiency of device-to-device paging and thus also enhance efficiency of device-to-device communication.

17 Claims, 10 Drawing Sheets

(51) Int. Cl.
*H04W 68/00* (2009.01)
*H04W 92/18* (2009.01)

(56) References Cited

U.S. PATENT DOCUMENTS

| | | | |
|---|---|---|---|
| 2013/0322277 A1* | 12/2013 | Vanganuru | H04W 24/08 370/252 |
| 2014/0185530 A1* | 7/2014 | Kuchibhotla | H04W 76/023 370/329 |
| 2014/0243038 A1* | 8/2014 | Schmidt | H04W 76/023 455/552.1 |
| 2014/0315562 A1* | 10/2014 | Lim | H04W 76/023 455/450 |
| 2014/0349579 A1* | 11/2014 | Zhou | H04W 12/06 455/41.2 |
| 2015/0003440 A1* | 1/2015 | Lim | H04W 76/023 370/346 |
| 2015/0119088 A1* | 4/2015 | Lee | H04W 68/02 455/458 |
| 2015/0296443 A1* | 10/2015 | Lim | H04W 48/12 370/312 |
| 2015/0319597 A1* | 11/2015 | Lee | H04W 8/005 455/434 |
| 2015/0327046 A1* | 11/2015 | Lee | H04W 56/002 370/338 |

* cited by examiner

WIRELESS COMMUNICATION DEVICE, WIRELESS COMMUNICATION METHOD AND BASE STATION

FIELD OF THE INVENTION

This disclosure relates to the field of wireless communications and more particularly to a wireless communication device, wireless communication method, and a base station for Device-to-Device (D2D) communication.

BACKGROUND OF THE INVENTION

In the next generation of wideband cellular mobile communication system (IMT-advanced), the base station (eNB)-centric communication mode has been hindered by the low utilization efficiency of spectrum resources. In view of this, such D2D device communication has been proposed at present that devices communicate directly with each other over reused resources in a cell to thereby improve the overall performance of the system. However in the existing D2D device communication technologies, typically a base station notifies only two communication devices for D2D communication that they are allowed to perform D2D communication, upon determining that the two communication devices can perform D2D communication with each other, but the initiating device may not know information about the target device (e.g., channel information, etc., of the target device), thus degrading the efficiency of subsequent D2D paging.

Thus there is a need of a wireless communication device and method, which can improve the efficiency of D2D paging and thus the efficiency of D2D communication.

SUMMARY OF THE INVENTION

The following is a summary of the invention to facilitate a basic understanding of some aspects of the invention. However it shall be appreciated that this summary is not an extensive overview of the invention, and it is intended neither to identify certain crucial or important elements of the invention nor to delineate the scope of the invention. Rather, the primary purpose of the summary is to present some concepts of the invention in a simplified form prior to the more detailed description that is presented hereinafter.

In view of the above drawback in the prior art, an object of this disclosure is to provide a wireless communication device, wireless communication method, and base station for device to device communication so as to overcome at least the problem in the prior art.

According to an embodiment of this disclosure, there is provided a wireless communication device for device to device communication, where the wireless communication device includes: a receiving component configured to receive paging signaling, sent when a predetermined condition of device to device communication is satisfied between the wireless communication device and another wireless communication device, to assist in paging between the wireless communication device and the other wireless communication device; wherein paging based upon the paging signaling is used to determine setup of device to device communication between the wireless communication device and the other wireless communication device.

According to another embodiment of this disclosure, there is provided a wireless communication method for device to device communication, where the wireless communication method includes: if a predetermined condition of device to device communication is satisfied between an initiating device initiating communication and a target device which is a communication target, then sending paging signaling respectively to the initiating device and the target device to assist in paging between the initiating device and the target device; and determining setup of device to device communication between the initiating device and the target device according to a result of paging the target device by the initiating device in response to the paging signaling.

According to another embodiment of this disclosure, there is provided a base station including: a condition determining component configured to determine whether communication devices for communication satisfy a predetermined condition of device to device communication; and a paging signaling sending component configured to send paging signaling to the communication devices to assist in paging between the communication devices, if it is determined that the predetermined condition is satisfied, wherein the paging signaling is used to determine setup of device to device communication between the communication devices.

Moreover an embodiment of this disclosure further provides a computer program for performing the wireless communication method above.

Furthermore an embodiment of this disclosure further provides a corresponding computer readable storage medium on which computer program codes for performing the wireless communication method above are stored.

The wireless communication device, wireless communication method, and base station above according to the embodiments of this disclosure can achieve the advantageous effect of improving device to device paging efficiency.

These and other advantages of this disclosure will become more apparent from the following detailed description of best modes of this disclosure with reference to the drawings.

BRIEF DESCRIPTION OF THE DRAWINGS

This disclosure can be better understood with reference to the description given below in conjunction with the accompanying drawings throughout which identical or like reference signs denote identical or like components and together with which the following detailed description are incorporated into and form a part of this specification and serve to further illustrate the preferred embodiments of this disclosure and to explain the principle and advantages of this disclosure. In the drawings.

Figure 1:
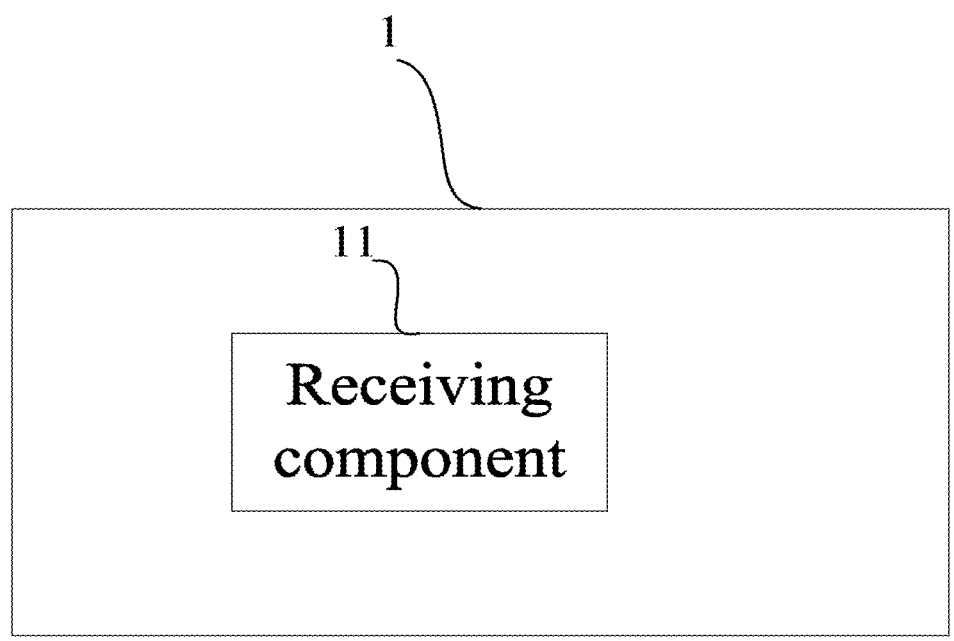
FIG. 1 is a structural block diagram schematically illustrating a wireless communication device according to an embodiment of this disclosure.

Those skilled in the art will appreciate that elements in the drawings are illustrated merely for simplicity and clarity and have not necessarily been drawn to scale. For example, dimensions of some of the elements in the drawings may have been enlarged relative to other elements to facilitate understanding of the embodiments of the present invention.

DETAILED DESCRIPTION OF THE INVENTION

Exemplary embodiments of the present invention will be described below in conjunction with the accompanying drawings. For the sake of clarity and conciseness, not all the features of practical implementations have been described in the specification. However it shall be appreciated that during developing any of such practical implementations, numerous implementation-specific decisions shall be made to achieve the developer's specific goals, for example, to comply with those system- and business-related constraining conditions which will vary from one implementation to another. Moreover it shall also be appreciated that such a development effort might be very complex and time-consuming but may simply be a routine task for those skilled in the art benefiting from this disclosure.

It shall further be noted that only those device structures and/or process steps closely relevant to the solutions of the invention will be illustrated in the drawings while other details less relevant to the invention are omitted so as not to obscure the invention due to those unnecessary details.

FIG. 1 is a structural block diagram schematically illustrating a wireless communication device according to a first embodiment of this disclosure.

As illustrated in FIG. 1, the wireless communication device 1 for device to device communication includes a receiving component 11 configured to receive paging signaling, sent when a predetermined condition of device to device communication is satisfied between the wireless communication device and another wireless communication device, to assist in paging between the wireless communication device and the other wireless communication device, where paging based upon the paging signaling is used to determine setup of device to device communication between the wireless communication device 1 and the other wireless communication device.

According to an embodiment of this disclosure, Location Area Code (LAC) information of the wireless communication device can be used to judge whether the predetermined condition of device to device communication is satisfied between the wireless communication device 1 and the other wireless communication device. A location area code represents an area which is set for paging, and typically a location area can include one or more cells. A location area can be arranged, and a location area code can be obtained, as well known in the field, so a repeated description thereof will be omitted here. According to a preferred embodiment of this disclosure, for example, if the wireless communication device 1 is located in the same location as the other communication device, then it can be determined that the predetermined condition of device to device communication can be satisfied, and thus D2D communication may be performed, between the wireless communication device 1 and the other device. If the predetermined condition of D2D communication is satisfied, then the wireless communication device 1 and the other wireless communication device can be determined as potential D2D wireless communication devices.

However this disclosure will not be limited thereto, but alternatively, for example, if the wireless communication device 1 is located in the same cell as the other wireless communication device, then it can be determined that the predetermined condition of device to device communication can be satisfied between the wireless communication device 1 and the other wireless communication device.

According to this disclosure, the "cell" can include but will not be limited to a macro cell, a micro cell, a pico cell, a Home base station (HeNodeB; HeNB) cell, a Relay Node (RN) cell.

According to an embodiment of this disclosure, the wireless communication device 1 may correspond to an initiating device initiating communication, and the other wireless communication device may correspond to a target device which is a communication target of the initiating device. According to another embodiment of this disclosure, alternatively the wireless communication device 1 may correspond to a target device which is a communication target, and the other wireless communication device may correspond to an initiating device initiating communication with the wireless communication device 1.

Figure 2:
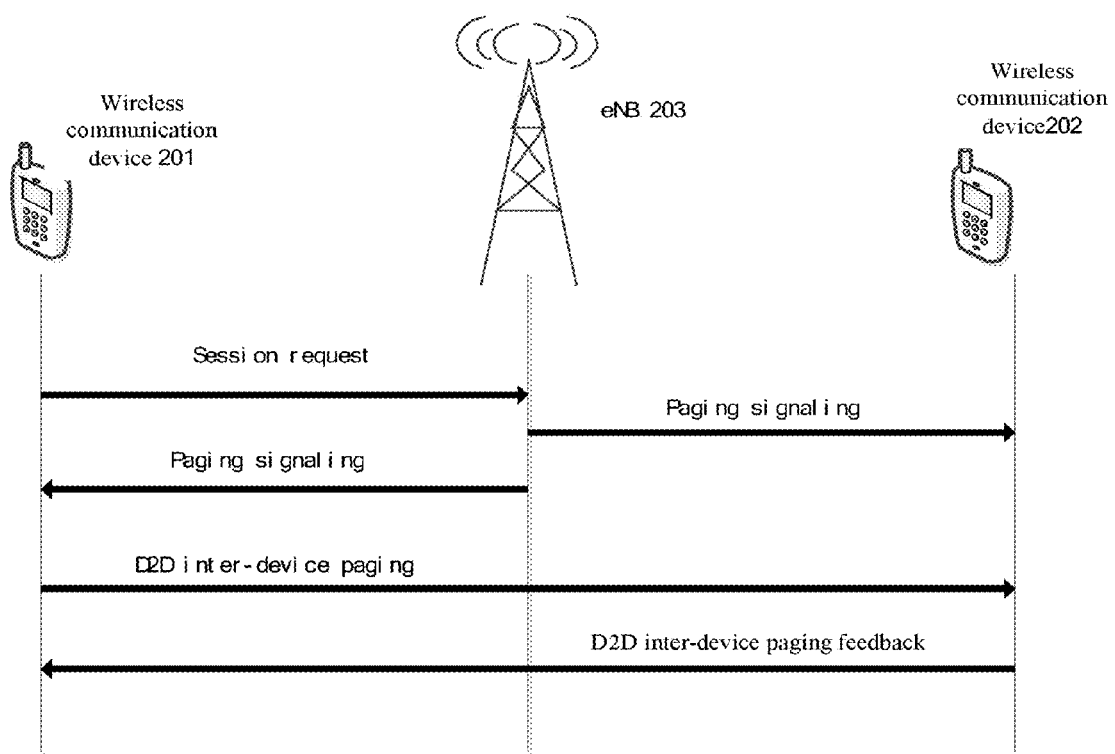
FIG. 2 is a structural block diagram illustrating a wireless communication system including wireless communication device for D2D communication.

Typically, for example, a core network or a base station (the eNB will be taken as an example in the following detailed description) can judge whether the predetermined condition of device to device communication is satisfied between the wireless communication device 1 and the other wireless communication device, according to position information sent thereto by the wireless communication devices, and if the predetermined condition of device to device communication is satisfied, then the base station will send paging signaling to the wireless communication devices to assist in paging between the wireless communication device 1 and the other wireless communication device. FIG. 2 illustrates a schematic diagram of a wireless communication system including wireless communication devices for D2D communication. As illustrated in FIG. 2, the communication system includes a wireless communication device 201 and a wireless communication device 202 for D2D communication, and an eNB 203. The wireless communication device 201 can correspond to the wireless communication device 1 according to the embodiment of this disclosure, and the wireless communication device 202 can correspond to the other wireless communication device according to the embodiment of this disclosure.

As illustrated in FIG. 2, for example, if the wireless communication device 201 which is an initiating device initiating communication initiates a D2D communication request to the eNB 203, then the eNB 203 judges whether the wireless communication devices 201 and 202 satisfy a predetermined condition of D2D communication, for example, according to location area information of the wireless communication device 201, and the wireless communication device 202 which is a target of the D2D communication request initiated by the wireless communication device 201. For example, if the location area information (e.g., Local Area Codes (LACs)) sent by the wireless communication devices 201 and 202 to the eNB 203 indicates that they are located in the same location area, then it is determined that they satisfy the predetermined condition of D2D communication, so that the eNB 203 sends paging signal respectively to the communication devices 201 and 202 to assist in D2D paging.

The eNB 203 notifies the wireless communication devices 201 and 202 by sending the paging signaling which is set for D2D communication, upon determining that the precondition of D2D communication is satisfied between the wireless communication device 201 and the other wireless communication device 202. The wireless communication devices 201 and 202 receive the paging signaling sent by the eNB, and obtain information required for D2D paging from the paging signaling.

The paging signaling according to the embodiment of this disclosure will be described below in details still taking the wireless communication system illustrated in FIG. 2 as an example.

According to an embodiment of this disclosure, a paging message corresponding to the paging signaling includes at least one of: information about a dedicated carrier for use in device to device communication, information about location areas of the wireless communication device and the other wireless communication device, and channel allocation information about a dedicated channel for device to device communication between the wireless communication device and the other wireless communication device.

Particularly after the eNB 203 determines that the precondition for D2D communication is satisfied between the wireless communication device 201 and the other wireless communication device 202, the wireless communication devices 201 and 202 receive a Physical Downlink Control Channel (PDCCH) sent by the eNB 203, and demodulate Downlink Control Information (DCI), scrambled by a Paging-Radio Network Temporary Identifier (P-RNTI), in the PDCCH to thereby know from an indicator in the DCI 1C format that there is a paging message arriving at the wireless communication devices 201 and 202. In this case, the wireless communication devices 201 and 202 demodulate a Physical Downlink Shared Channel (PDSCH) in the same sub-frame to thereby obtain the paging message including at least one of:

Access parameter information, i.e., information, defined by the eNB, required for the accessing wireless communication devices to transmit over the channel, includes information about the dedicated carrier for use in D2D communication after transmission;

A frequency at which the eNB communicates with the wireless communication device, where the eNB still maintains the control channel connection with the wireless communication devices even after D2D communication commences, to thereby prevent a link from being potentially degraded, which would otherwise result in switching back to traditional communication;

LAC list information providing parameter information of adjacent eNB s, which carries LAC information of the wireless communication device for D2D communication to thereby provide the other wireless communication device with position information to determine and adjust transmit power, etc.;

Channel configuration information including channel configuration information about a dedicated channel allocated by the eNB accessed randomly by the wireless communication device so that the wireless communication device 201 and 202 access the dedicated channel; and A carrier frequency (at the same or different frequency) occupied by the other wireless communication device so that the wireless communication device adjusts receiving frequency bands of a transmitter and a receiver to thereby ensure paging to be detected properly.

Although the paging message includes the access parameter information, the LAC list information, and the channel allocation information as described above, those skilled in the art can appreciate that the paging message further includes system parameter information, channel list information, standard instruction information, etc., and these information is well known to those skilled in the art, so a repeated description thereof will be omitted here.

The wireless communication devices 201 and 202 obtain the paging message including the information required for subsequent D2D paging, upon reception of the paging signaling sent by the eNB 203, and choose to be tune to the dedicated channel of D2D communication, allocated by the eNB 203 for them, in response to the paging message to wait for D2D paging to be transmitted and received.

As compared with traditional control signaling sent by the eNB, the paging signaling according to the embodiment of this disclosure carries the paging message relating to the wireless communication devices for D2D communication without carrying some traditional paging messages, to thereby assist in subsequent D2D paging while reducing the paging message.

According to another embodiment of this disclosure, the paging signaling can include at least a cross-carrier scheduling indicator to tune the wireless communication device and the other wireless communication device to the dedicated carrier which is set for device to device communication, and the wireless communication devices know the information about the dedicated carrier of device to device communication from the cross-carrier scheduling indicator, and demodulate to obtain the paging message corresponding to the paging signaling according to the cross-carrier scheduling indicator.

Particularly after the eNB 203 determines that the wireless communication device 201 can perform D2D communication with the other wireless communication device 202, the wireless communication devices 201 and 202 receive the paging signaling sent by the eNB, which is set for D2D communication to assist in D2D paging between the wireless communication devices 201 and 202 for D2D communication.

According to an embodiment of this disclosure, the wireless communication devices 201 and 202 receive the PDCCH sent by the eNB, and demodulates the DCI 1C, in the PDCCH, scrambled by the Paging-Radio Network Temporary Identifier for D2D communication (D2D_P-RNTI). The DCI scrambled by the D2D_P-RNTI is a dedicated format of D2D paging. The DCI is demodulated into D2D DCI which is a dedicated format of D2D paging, having a function of cross-carrier scheduling indicator. Resource block allocation is conveyed in the DCI so that the wireless communication devices 201 and 202 for D2D communication are tuned into the PDSCH of the dedicated carrier which is set by the eNB 203 for D2D communication, so each of the wireless communication devices 201 and 202 for D2D communication is cross-carrier scheduled, according to the cross-carrier indicator, into the PDSCH of the dedicated carrier which is set for D2D communication, to demodulate the paging message to obtain a paging message corresponding to the paging signaling. The paging message includes at least one of:

A frequency at which the eNB communicates with the wireless communication devices, where the eNB still maintains the control channel connection with the wireless communication devices even after D2D communication commences, to thereby prevent a link from being potentially degraded, which would otherwise result in switching back to traditional communication;

LAC list information providing parameter information of adjacent eNB s, which carries LAC information of the wireless communication device for D2D communication to thereby provide the other wireless communication device with position information to determine and adjust transmit power, etc.; and A carrier frequency (at the same or different frequency) occupied by the other wireless communication device so that the wireless communication device adjusts receiving frequency bands of a transmitter and a receiver to thereby ensure paging to be detected properly.

Upon reception of the paging signaling sent by the eNB 203, the wireless communication devices 201 and 202 are tuned into the dedicated carrier which is set by the eNB for D2D communication, according to the cross-carrier scheduling indicator D2D DCI, to wait for D2D paging to be transmitted and received.

As compared with traditional control signaling sent by the eNB, the paging signaling according to the embodiment of this disclosure does not carry some traditional paging message, and also since the wireless communication devices when demodulating the PDSCH have accessed the dedicated carrier allocated by the eNB for them, the paging message can be further reduced so that they can be tuned directly to the dedicated carrier for D2D communication.

As illustrated in FIG. 2, the wireless communication device 201 initiates paging to the other wireless communication device 202 which is a communication target, in response to the paging signaling sent by the eNB 203.

Figure 3:
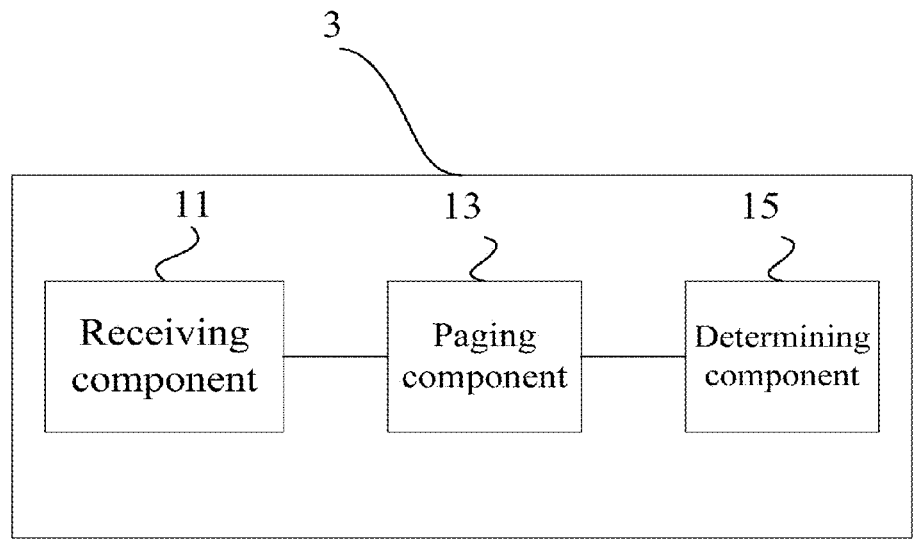
FIG. 3 schematically illustrates an exemplary structure of a wireless communication device which is an initiating device initiating communication.

FIG. 3 illustrates an exemplary structure of the wireless communication device 1 in FIG. 1, which is an initiating device initiating communication.

In addition to the receiving component 11, similarly as the wireless communication device 1 illustrated in FIG. 1, the wireless communication device 3 illustrated in FIG. 3 further includes: a paging component 13 configured to initiate paging to the other wireless communication device over the dedicated carrier based upon information about the dedicated carrier; and a determining component 15 configured to determine setup of device to device communication between the wireless communication device and the other wireless communication device depending upon whether paging by the paging component 13 succeeds.

If the paging component 13 in the wireless communication device 3 initiates paging to the other wireless communication device, then the determining component 15 determines setup of device to device communication between the wireless communication device and the other wireless communication device depending upon whether paging by the paging component 13 succeeds.

Figure 4:
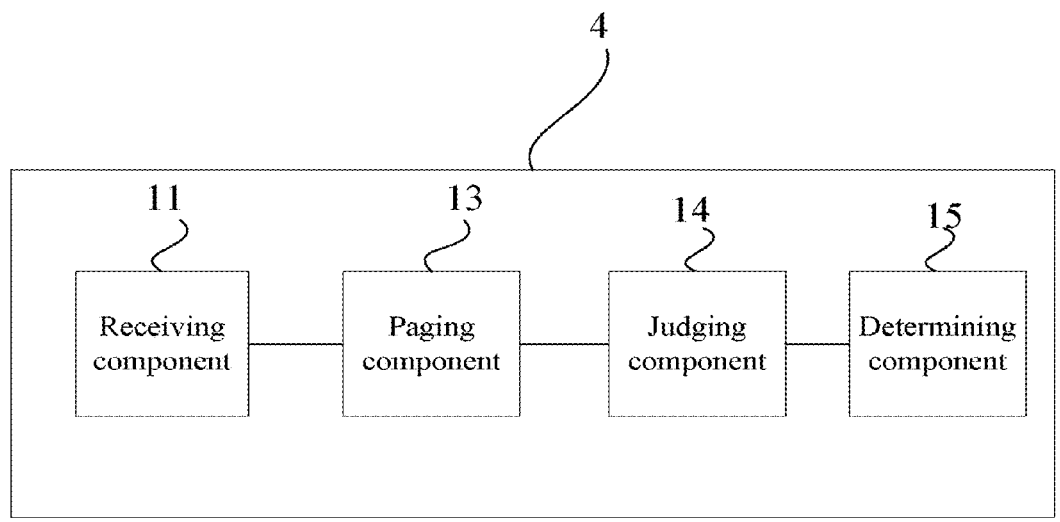
FIG. 4 schematically illustrates another exemplary structure of a wireless communication device which is an initiating device initiating communication.

FIG. 4 is another exemplary structure schematically illustrating the wireless communication device according to the embodiment of this disclosure.

In addition to the receiving component 11, the paging component 13, and the determining component 15, similarly as the wireless communication device 3 illustrated in FIG. 3, the wireless communication device 4 illustrated in FIG. 4 further includes: a judging component 14 configured to judge whether paging by the wireless communication device succeeds, depending upon whether the wireless communication device 4 receives a response of the other wireless communication device to paging sent by the wireless communication device in a first predetermined period of time.

More particularly the judging component 14 judges that paging by the paging component 13 in the wireless communication device 4 succeeds if the wireless communication device 4 receives a response of the other wireless communication device in the first predetermined period of time, and judges that paging by the paging component 13 in the wireless communication device 4 fails if the wireless communication device 4 does not receive a response of the other wireless communication device in the first predetermined period of time. Typically the other wireless communication device which is a communication target sends a paging response to the wireless communication device 4 upon reception of paging by the wireless communication device 4, so it can be judged whether paging succeeds, depending upon whether the wireless communication device 4 sending paging receives the paging response in addition to reception by the other wireless communication device of paging by the wireless communication device. Moreover those skilled in the art can appreciate the first predetermined period of time according to the embodiment of this disclosure can be set at will taking into account the position information of the communication devices, and other factors.

For example, a reason for a failure in paging includes at least one of: update of the location area, reselection of a cell, and update of a cell, where the other wireless communication device is located; state abnormality of the cell where the other wireless communication device is located; the other wireless communication device being outside of a service area or being in a weakly covered area; a busy network where the other wireless communication device is located; inappropriate setting of a parameter, e.g., a paging indicator block resource, etc.; insufficient power of an uplink channel; etc.

If the judging component 14 judges a failure in paging, then the determining component 15 can determine not to set up device to device communication between the wireless communication device 4 and the other wireless communication device, according to the result of judgment by the judging component 14.

A Physical Uplink Control Channel (PUCCH) over which the paging component 13 initiates paging includes a paging module configured to determine whether the paging is device to device paging; and the physical uplink control channel is received and demodulated by the other wireless communication device for the paging message corresponding to the paging initiated by the wireless communication device.

According to an embodiment of this disclosure, the D2D_paging paging module is embedded in the PUCCH of the wireless communication device 4 initiating communication, and the other wireless communication device which is a communication target receives and can demodulate the PUCCH sent by the wireless communication device 4 for the paging message therein.

Figure 5A:
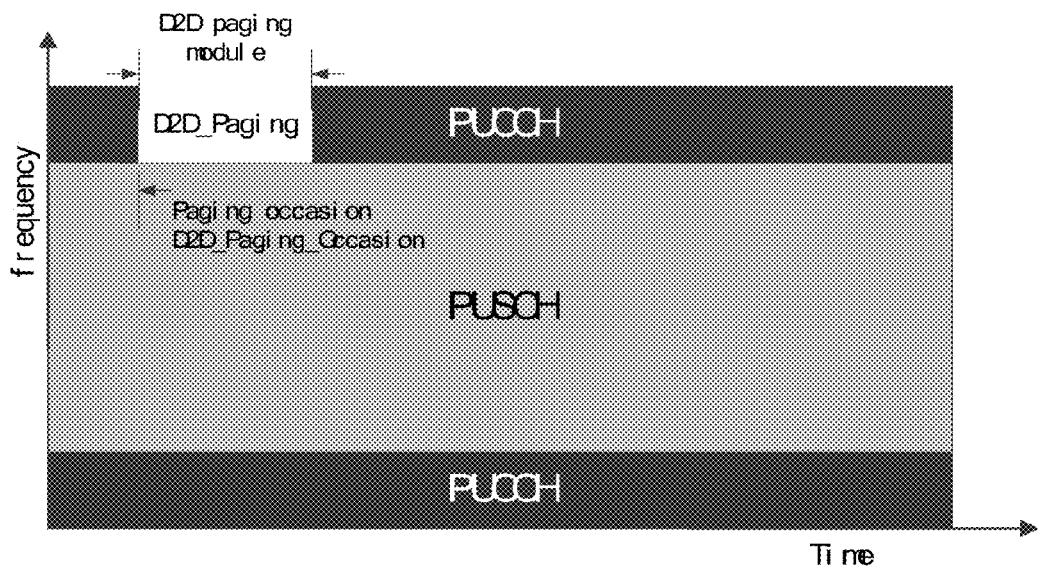
FIG. 5a and FIG. 5b illustrate a format of paging signaling sent by a wireless communication device and a format of response paging signaling of another wireless communication device respectively.

FIG. 5a and FIG. 6b illustrate a format of paging signaling sent by the wireless communication device 4 initiating communication and a format of response signaling of the other wireless communication device which is a target device to the received paging signaling respectively.

Figure 5B:
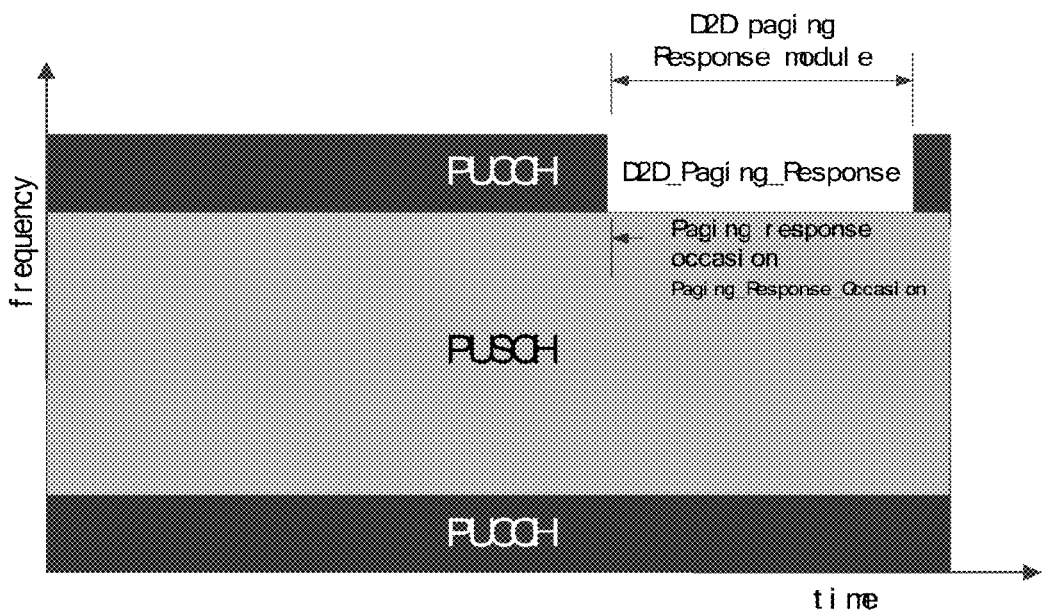

As illustrated in FIG. 5a and FIG. 5b, since the PUCCH carries Uplink Control Information (UCI), it will not be transmitted together with the PUSCH but will be arranged at the edge of an uplink bandwidth. The initiating device sends the PUCCH in a broadcast manner all the time, and the target device monitors the PUCCH, where a specific occasion on which the paging module is present in the PUCCH is referred to as a D2D paging occasion (D2D PO, D2D_Paging_Occasion), and two related parameters to determine the PO are T and nB, which is notified to the UE by a System SIB 2.

The target device detects the PUCCH in the corresponding sub-frame after calculating the particular position from the PO-related parameters. The target device monitors the received PUCCH all the time, and if the D2D paging module is demodulated on the Paging Occasion (PO) of the PUCCH, then the D2D paging module is compared with the ID of the target device, and if a UE ID (an IMSI or an S-TMSI) carried in the D2D paging module matches the UE ID of the target device, then a paging response signaling is sent to the initiating device. As illustrated in FIG. 5b, the paging response D2D_Paging_Response module is transmitted in the PUCCH on the Paging_Response_Occasion (PRO) occasion, where the paging response module includes a paging response component indicating that D2D paging is received.

As compared with a traditional paging block, the D2D_Paging module is embedded in the PUCCH, whether paging is D2D paging can be judged from the structure of the frame without any significant modification to the traditional paging block.

According to an embodiment of this disclosure, there is further provided the wireless communication device which continues with paging, by changing a paging parameter after initial paging fails. Particularly in this case, the paging component 13 is further configured to extend a paging range of the wireless communication device and/or access an eNB serving the wireless communication device 4 to assist in continue with paging, upon determining a failure in paging by the wireless communication device 4; and the determining component 15 is further configured to determine setup of device to device communication between the wireless communication device and the other wireless communication device according to a result of continuing with paging. In this case, the judging component 14 makes judgment for a result of paging similarly to initial paging as described above, and the determining component 15 determines setup of device to device communication between the wireless communication device and the other wireless communication device according to the result of paging as judged by the judging component 14.

According to an embodiment of this disclosure, the paging component 13 is configured to extend the paging range from the location area where the wireless communication device is located to the entire location area covered by its maximum power, according to the information about the location areas of the wireless communication device 1 and the other wireless communication device, or change a paging frequency band to continue with paging. For example, if the other wireless communication device which is a target device is paged unsuccessfully, for example, because it moves to another location area, an eNB serving the other wireless communication device notifies the wireless communication device which is an initiating device, of the frequency band, of the other wireless communication device, changed due to interference coordination so that the wireless communication device changes the paging frequency band and continues with paging the other wireless communication device.

More particularly, according to an embodiment of this disclosure, paging can be made for three times: initial paging is made in the location area according to the location area information of the wireless communication device; if initial paging fails, then the paging range is extended from the location area where the wireless communication device is located, to the entire location area covered by the maximum power of the wireless communication device, and paging is made again, where precise GPRS positioning paging can be made; and if paging fails again, then paging is made for the third time with the assistance by the eNB serving the wireless communication device which is an initiating device, where paging is made for the third time in the changed carrier frequency band of the other wireless communication device, sent by the eNB. Typically after paging fails for the third time, a length of time for paging may become so large that the wireless communication device will be released early and thus lose the paging message, so paging may be made for three times, which is an upper limit of D2D paging. However this disclosure will not be limited thereto, but those skilled in the art can appreciate one, two, four, etc., times can alternatively be set as an upper limit of D2D paging as needed.

If the judging component 14 judges a failure in paging for the third time, then the determining component 15 determines not to set up device to device communication between the wireless communication device 4 and the other wireless communication device.

On the other hand, according to an embodiment of this disclosure, if the judging component 14 judges successful paging by the paging component, then the determining component 15 can determine setup of device to device communication between the wireless communication device and the other wireless communication device according to a measurement result of the other wireless communication device on paging sent by the wireless communication device.

Particularly upon reception of paging by the wireless communication device 4 initiating communication, the other wireless communication device which is a communication target measures a quality (such as the power of the signal, etc.) of the paging signaling sent by the wireless communication device 4, and reports a measurement result to the wireless communication device 4, and the wireless communication device 4 determines whether to set up D2D communication between the wireless communication device 4 and the other wireless communication device, according to the measurement result.

For example if the measurement result indicates a poor communication quality of the communication link between the wireless communication device 4 and the other wireless communication device, then the wireless communication device 4 determines no possibility to set up D2D communication between the wireless communication device 4 and the other wireless communication device. In this case, the wireless communication device 4 communicates with the other wireless communication device through the eNB. In another example if the measurement result indicates such a communication quality of the communication link between the wireless communication device 4 and the other wireless communication device that D2D communication can be performed, then the wireless communication device 4 determines that D2D communication can be set up between the wireless communication device 4 and the other wireless communication device, and starts to communicate with the other wireless communication device.

Figure 6:
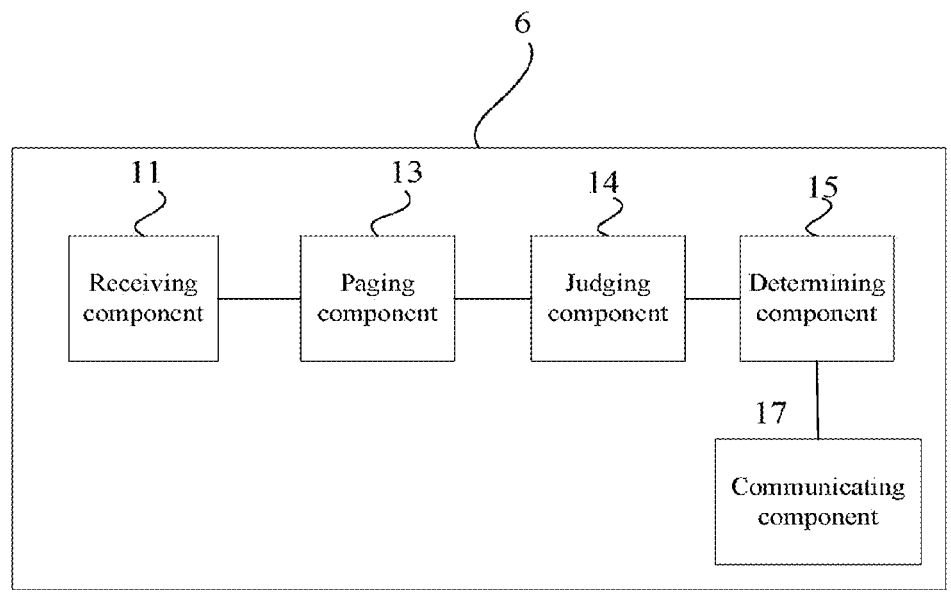
FIG. 6 schematically illustrates another exemplary structure of a wireless communication device according to an embodiment of this disclosure.

FIG. 6 schematically illustrates another exemplary structure of a wireless communication device according to an embodiment of this disclosure.

In addition to the receiving component 11, the paging component 13, the judging component 14, and the determining component 15, similarly as the wireless communication device 4 illustrated in FIG. 4, the wireless communication device 6 illustrated in FIG. 6 further includes: a communicating component 17 configured to enable the wireless communication device 6 to perform device to device communication with the other wireless communication device over the dedicated carrier in a manner of reusing resources, when setup of device to device communication between the wireless communication device 6 and the other wireless communication device is determined.

Particularly if the determining component 15 determines setup of device to device communication between the wireless communication device 6 and the other wireless communication device, then the communicating component 17 enables the wireless communication device 6 to perform device to device communication with the other wireless communication device directly over the dedicated carrier which is set for D2D communication in a manner of reusing resources.

D2D communication can be started directly over the dedicated carrier indicated by the paging signaling sent to the wireless communication device 6 and the other wireless communication device upon successful paging to thereby avoid occupancy by other signaling between the wireless communication devices and the eNB about resource allocation.

Moreover, the wireless communication device according to the embodiment of this disclosure is further provided with a function of link detection in D2D communication so that a dual-connectivity link including a traditional link and a D2D communication link is started between the wireless communication devices for D2D communication when the link is damaged.

Figure 7:
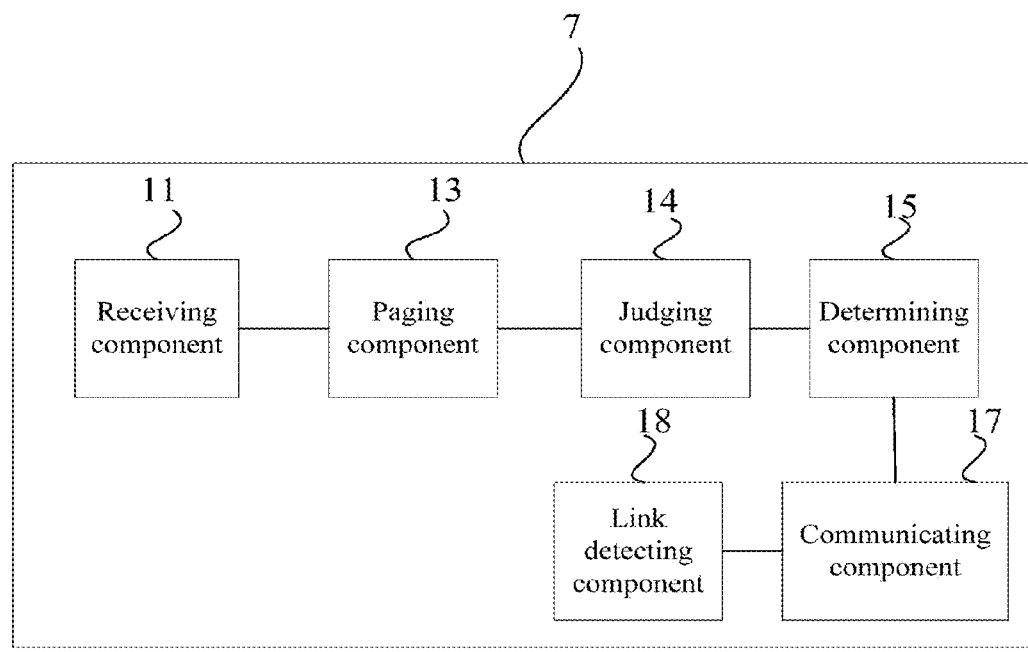
FIG. 7 schematically illustrates still another exemplary structure of a wireless communication device according to an embodiment of this disclosure.

FIG. 7 is still another exemplary structure of a wireless communication device according to an embodiment of this disclosure.

In addition to the receiving component 11, the paging component 13, the judging component 14, the determining component 15, and the communicating component 17, similarly as the wireless communication device 6 illustrated in FIG. 6, a wireless communication device 7 illustrated in FIG. 7 further includes: a link detecting component 18 configured to evaluate a received signal if device to device communication is set up between the wireless communication device 7 and the other wireless communication device, and to determine a damage to the link for device to device communication if there is occurring at least one of:

(i) Power of the received signal is below a first threshold;
(ii) A failure ratio of data transmission is above a second threshold; and
(iii) A probability that data are retransmitted is above a third threshold.

Particularly the link detecting component 18 evaluates the quality of the link for D2D communication upon reception of a signal sent by the opposite party during D2D communication by the wireless communication devices for D2D communication, where transmit power of the signal can be adapted dynamically to a condition of the evaluated link, and if the power of the received signal is below the first threshold, the failure ratio of data transmission is above the second threshold, or the probability that data are retransmitted is above the third threshold, then the link detecting component 18 determines a damage to the link for D2D communication, and reports this condition to the eNB serving the wireless communication device. In this case, the primary serving eNB sets up traditional link connection between the wireless communication devices for D2D communication, that is, the wireless communication devices communicate with each other through the eNB.

According to a preferred embodiment of this disclosure, if the link for D2D communication is damaged, for example, the primary serving eNB instructs the wireless communication device which is an initiating device to continue with paging the other wireless communication device which is a target device, in addition to the traditional link connection which is set up between the wireless communication devices, to thereby start the dual-connectivity link between the devices for D2D communication.

Figure 8:
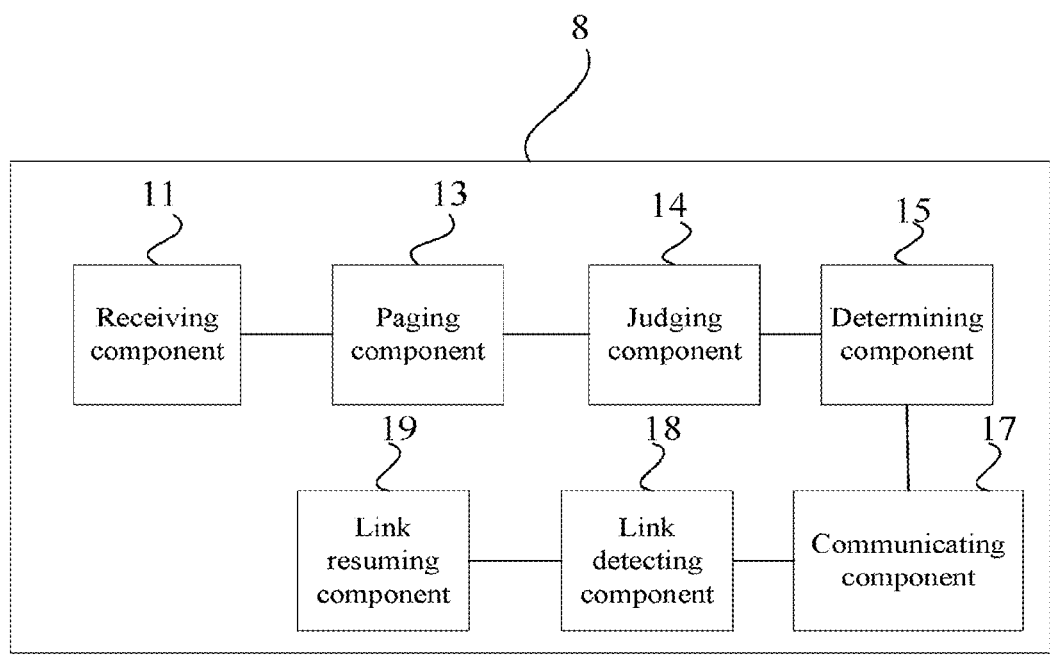
FIG. 8 schematically illustrates a further exemplary structure of a wireless communication device according to an embodiment of this disclosure.

FIG. 8 schematically illustrates a further exemplary structure of a wireless communication device according to an embodiment of this disclosure.

In addition to the receiving component 11, the paging component 13, the judging component 14, the determining component 15, the communicating component 17, and the link detecting component 18, similarly as in the wireless communication device 7 illustrated in FIG. 7, a wireless communication device 8 illustrated in FIG. 8 further includes: a link resuming component 19 configured to send a request for setting up communication connection between the wireless communication device and the other wireless communication device through the eNB, and to instruct the paging component 13 to initiate paging to the other wireless communication device, upon a damage to the link for device to device communication is determined, where if the paging component 13 pages successfully, then the link resuming component 13 is configured to resume device to device communication between the wireless communication device and the other wireless communication device.

Figure 9:
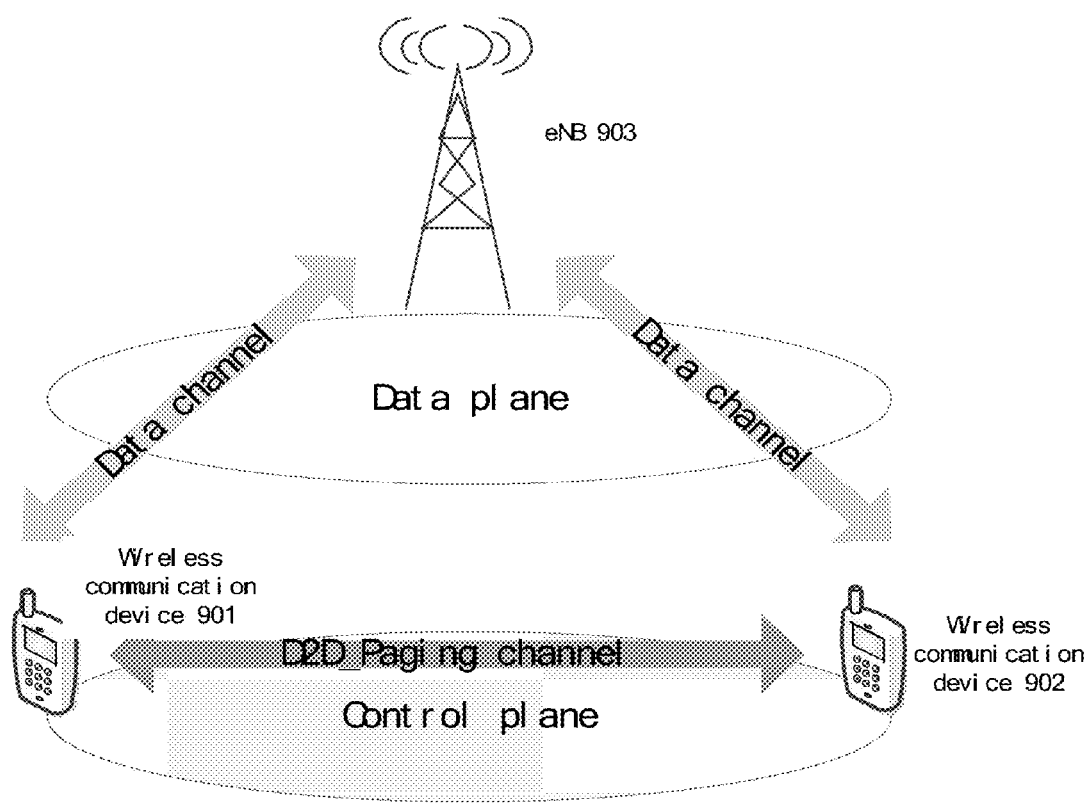
FIG. 9 illustrates an example in which a dual-connectivity link is set up between communication devices for D2D communication after a D2D communication link is damaged.

FIG. 9 illustrates an example in which a dual-connectivity link is set up between the communication devices for D2D communication after the D2D communication link is damaged.

As illustrated in FIG. 9, the dual-connectivity link includes: data channel connection between the wireless communication device and the eNB, that is, data plane connection, which is traditional low-frequency link connection, to guarantee a communication QoS demand between the wireless communication devices; and D2D_Paging channel (D2D paging channel) connection between the wireless communication device and the other wireless communication device, that is, a control plane connection, which is D2D high-frequency link connection, for D2D paging to resume the D2D communication link connection.

If a wireless communication device 901 pages successfully another wireless communication device 902 which is a target device, then the link resuming component resumes the D2D communication link, and the wireless communication device 901 and the other wireless communication device 902 release U plane connection with an eNB 903, and switch to U plane connection in a D2D specific frequency band. According to a preferred embodiment of this disclosure, the number of times for paging can be set, for example, if paging fails for each of three times, then it can be determined that D2D communication can not be set up between the wireless communication device 901 which is an initiating device, and the other wireless communication device 902, so that they perform traditional communication with each other through the eNB.

According to an embodiment of this disclosure, the dual-connectivity link can be set up with the assistance of carrier aggregation, where a low-frequency data channel carrier and a high-frequency control channel carrier of the wireless communication devices are carrier aggregated so that the data channel and the control channel can operate separately in this mode.

In this case, since no data channel but only the control channel is occupied by the carrier between the wireless communication devices, the carrier can be in a new carrier pattern (NCT); and since only the data channels are occupied by the carriers between the wireless communication devices and the eNB, the carriers can also be in the new carrier pattern. The control channel carrier C_NCT in the new carrier pattern, and the data channel carrier U_NCT in the new carrier pattern can be aggregated for transmission or can be aggregated separately from other carriers for transmission or can be transmitted separately as stand_alone channel carriers.

The particular structure of the wireless communication device 1 in FIG. 1, which is an initiating device initiating communication has been described above with reference to FIG. 3 to FIG. 9, but the wireless communication device 1 can alternatively correspond to a target device which is a communication target.

Referring back to FIG. 1, if the wireless communication device 1 is a target communication device, then the wireless communication device 1 is further configured to monitor paging ahead by a predetermined period of time so that the other wireless communication device initiates paging in synchronization with reception of paging by the wireless communication device 1.

In a TDD system, the wireless communication device transmits and receives in different time slots over the same frequency carrier so that a reception channel and a transmission channel are distinguished temporally. At this time the initiating device and the target device still maintain synchronization with the eNB, and since transmission and reception by the initiating device and the target device needs to be synchronized, the target device is configured to adjust a downlink alignment position automatically.

Particularly since downlink sub-frames are always transmitted in the sub-frames 0 and 5, and a special sub-frame is always transmitted in the sub-frame 1, in the TDD system, the target device can monitor paging by delaying 2 to 4 Transmission Time Intervals (TTIs) or ahead by 3 TTIs so that the initiating device initiates paging in synchronization with reception of paging by the receiving device.

According to the embodiment of this disclosure, if the physical uplink control channel of the wireless communication device which is an initiating device includes the paging module, then the wireless communication device which is a target device can monitor paging by monitoring the paging module in the PUCCH directly.

According to an embodiment of this disclosure, there is further provided a wireless communication method for device to device communication. An exemplary process of the wireless communication method will be described below with reference to FIG. 10.

Figure 10:
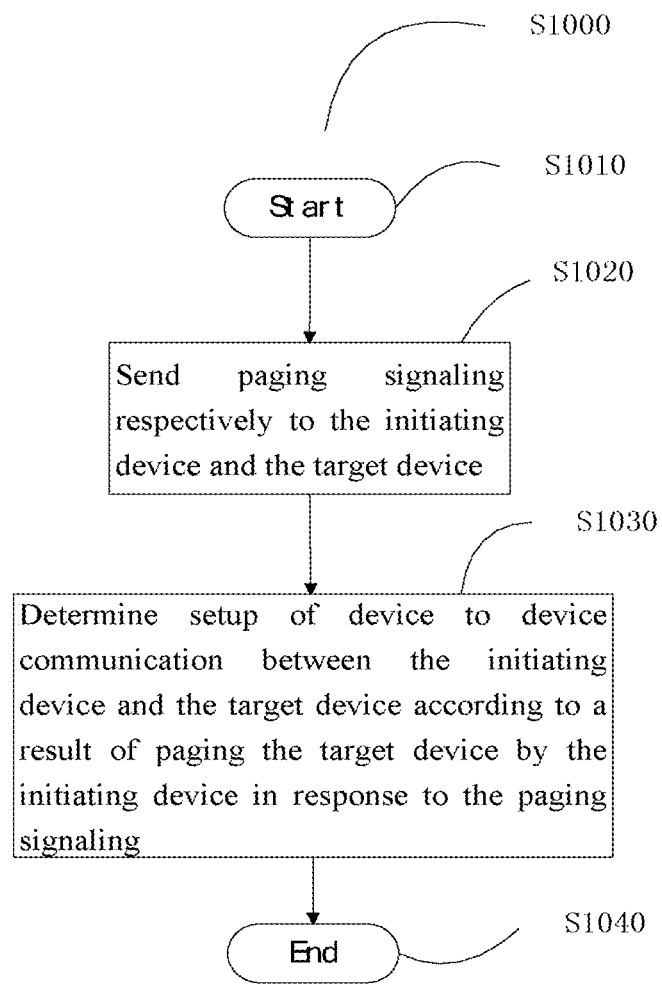
FIG. 10 is a flow chart schematically illustrating a wireless communication method according to an embodiment of this disclosure.

As illustrated in FIG. 10, a process flow 900 of the wireless communication method according to the embodiment of the invention starts with S1010, and then proceeds to the process of S1020.

In S1020, if a predetermined condition of device to device communication is satisfied between an initiating device initiating communication and a target device which is a communication target, then paging signaling is sent respectively to the initiating device and the target device to assist in paging between the initiating device and the target device. For example, the step S1020 can be performed by an eNB or a core network, for example. Reference can be made, for example, to the description of the wireless communication system and the paging signaling with reference to FIG. 1 and FIG. 2 for details about whether the predetermined condition of device to device communication is satisfied between the communication devices, and how the paging signaling is sent, so a repeated description thereof will be omitted here. Then the flow proceeds to S1030.

In S1030, setup of device to device communication between the initiating device and the target device is determined according to a result of paging the target device by the initiating device in response to the paging signaling. S1030 can be performed, for example, by performing the process in the determining component 15 as described with reference to FIG. 3 to FIG. 8, so a repeated description thereof will be omitted here. Then the flow proceeds to S1040.

The process flow 1000 ends at S1040.

In the wireless communication method according to an embodiment of this disclosure, a paging message corresponding to the paging signaling can include at least one of: information about a dedicated carrier for use in device to device communication, information about location areas of the initiating device and the target communication device, and channel allocation information about a dedicated channel for device to device communication between the wireless communication device and the other wireless communication device.

In the wireless communication method according to another embodiment of this disclosure, the paging signaling includes at least a cross-carrier scheduling indicator to tune the initiating device and the target device to the dedicated carrier which is set for device to device communication, and the initiating device and the target device know the information about the dedicated carrier of device to device communication from the cross-carrier scheduling indicator, and demodulate according to the cross-carrier scheduling indicator for the paging message corresponding to the paging signaling.

Figure 11:
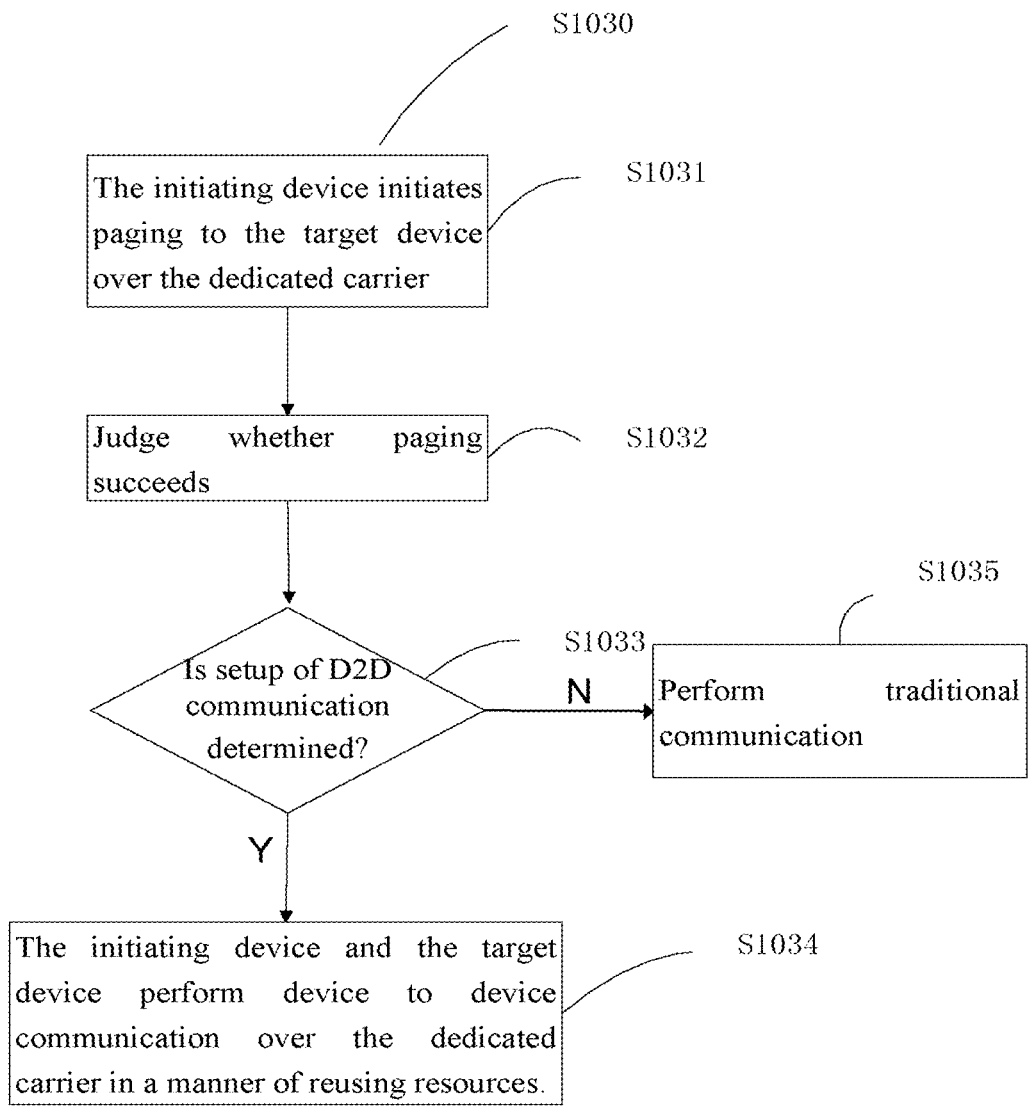
FIG. 11 illustrates an exemplary process in which setup of D2D communication is determined according to an embodiment of this disclosure.

FIG. 11 illustrates an exemplary process of S1030 in which setup of D2D communication is determined according to an embodiment of this disclosure.

As illustrated in FIG. 11, in S1031, the initiating device initiates paging to the target device over the dedicated carrier based upon the information about the dedicated carrier. S1031 can be performed, for example, by performing the process in the determining component 15 as described with reference to FIG. 3 to FIG. 8, so a repeated description thereof will be omitted here. Then the flow proceeds to S1032.

According to the embodiment of this disclosure, the target device can detect a paging channel ahead by a third predetermined period of time so that the initiating device sends paging in synchronization with reception of paging by the target device.

In S1032, whether paging by the initiating device succeeds is judged depending upon whether the target device receives paging by the initiating device in a first predetermined period of time, or the initiating device receives a response of the target device to paging sent by the initiating device, in a second predetermined of time. In the wireless communication method according to the embodiment of this disclosure, S1032 can be performed, for example, by performing the process in the judging component 14 as described with reference to FIG. 4 to FIG. 8, so a repeated description thereof will be omitted here. Then the flow proceeds to S1033.

In S1032, whether paging by the initiating device succeeds can be judged depending upon whether the target device receives paging by the initiating device in the first predetermined period of time, or the initiating device receives a response of the target device to the paging sent by the initiating device in the second predetermined of time; and more particularly if the target device receives paging by the initiating device in the first predetermined period of time, or the initiating device receives a response of the target device to paging sent by the initiating device, in the second predetermined of time, then it is judged that paging by the initiating device succeeds; and if the target device does not receive paging by the initiating device in the first predetermined period of time, then it is judged that paging by the initiating device fails.

In S1033, setup of device to device communication between the initiating device and the target device is determined depending upon whether paging by the initiating device succeeds, and if setup of device to device communication between the initiating device and the target device is determined due to successful paging by the initiating device, then the flow proceeds to S1034; otherwise, if paging by the initiating device fails, then the flow proceeds to S1035.

According to the embodiment of this disclosure, in S1033, for example, if paging by the initiating device succeeds, then setup of device to device communication between the initiating device and the target device can be determined further according to a measurement result of the target device on paging sent by the initiating device.

In S1034, the initiating device and the target device perform device to device communication over the dedicated carrier in a manner of reusing resources.

In S1035, the initiating device and the target device perform traditional communication, that is, they communicate through an eNB.

According to the embodiment of this disclosure, in S1031, the initiating device pages over a physical uplink control channel including a paging module configured to determine whether paging is device to device paging; and the target device receives and demodulates the physical uplink control channel of the initiating device for the paging message sent by the initiating device.

According to an embodiment of this disclosure, in S1033, if paging by the initiating device succeeds, then setup of device to device communication between the initiating device and the target device is determined according to a measurement result of the target device on paging sent by the initiating device.

According to an embodiment of this disclosure, the target device monitors paging ahead by a third predetermined period of time so that the initiating device sends paging in synchronization with reception of paging by the target device.

According to an embodiment of this disclosure, S1032 can further include: if a failure in paging is judged, then extending a paging range of the initiating device and/or accessing an eNB serving the initiating device to assist in continuing with paging, and determining setup of device to device communication between the initiating device and the target device according to a result of continuing with paging.

According to a preferred embodiment of this disclosure, the paging range can be extended from a location area where the initiating device is located, to the entire location area covered by maximum power of the initiating device or a paging frequency band can be changed to continue with paging.

The wireless communication method according to the embodiment of this disclosure further includes: if it is determined in S1030 that the initiating device can establish device to device communication with the target device, then setting up and performing device to device communication between the initiating device and the target device, and evaluating, by the initiating device and the target device, signals received by each other in inter-device communication, and determining a damage to a link for device to device communication if there is occurring at least one of:
 (i) Power of the signal received by the initiating device or the target device is below a first threshold;
 (ii) A failure ratio of data transmission is above a second threshold; and
 (iii) A probability that data are retransmitted is above a third threshold.

The wireless communication method according to the embodiment of this disclosure further includes: setting up communication connection between the initiating device and the target device through an eNB, and initiating, by the initiating device, paging to the target device, upon determining a damage to the link for device to device communication, where if paging initiated by the initiating device to the target device succeeds, then device to device communication between the initiating device and the target device is resumed.

According to the preferred embodiment of this disclosure, dual link connection including communication connection which is performed through the eNB, and device to device connection between the initiating device and the target device can be implemented by carrier aggregation.

Moreover the wireless communication method according to the embodiment of this disclosure further includes: determining whether the initiating device and the target device satisfy the predetermined condition of device to device communication, according to location area information of the initiating device and the target device.

Figure 12:
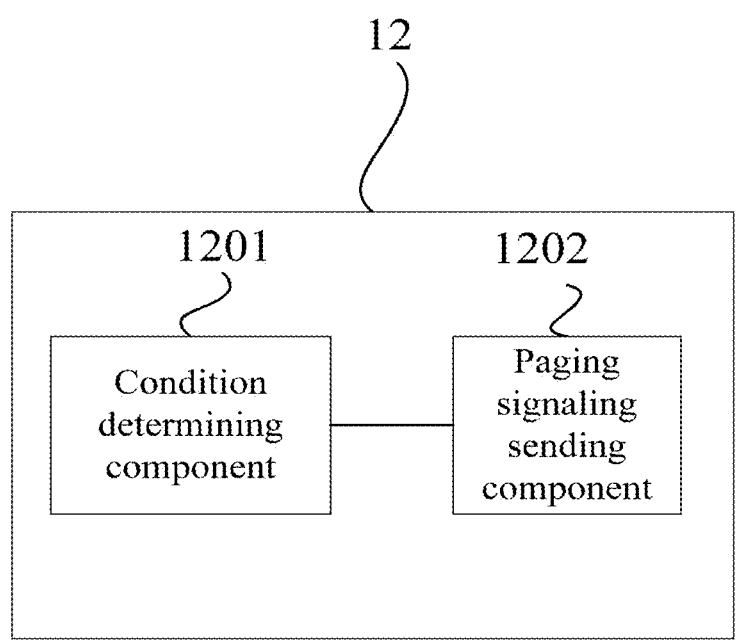
FIG. 12 is a structural block diagram schematically illustrating a base station according to an embodiment of this disclosure.

According to an embodiment of this disclosure, there is further provided an eNB. Next a configuration example of the eNB according to the embodiment of this disclosure will be described with reference to the block diagram in FIG. 12. For example, the eNB can include but will not be limited to a macro cellular eNB, a micro cellular eNB, a pi co cellular eNB, a relay node or a home eNB.

The eNB 1200 according to the embodiment of this disclosure includes: a condition determining component 1201 configured to determine whether communication devices for communication satisfy a predetermined condition of device to device communication; and a paging signaling sending component 1202 configured to send paging signaling to the communication devices to assist in paging between the communication devices, if it is determined that the predetermined condition is satisfied, where the paging signaling is used to determine setup of device to device communication between the communication devices.

According to a preferred embodiment of this disclosure, the condition determining component 1201 is configured to determine whether an initiating device and a target device satisfy the predetermined condition of device to device communication, according to location area information of the initiating device and the target device. For example, the eNB 1200 according to the embodiment of this disclosure can be the eNB 203 as described with reference to FIG. 2. The eNB 1200 sends, for example, a PDCCH including DCI 1C scrambled by a P-RNTI to the communication devices to convey the paging signaling, sends a paging message in a PDSCH indicated by the DCI 1C, etc., and reference can be made to the description above in FIG. 2 for particular formats and contents of the paging signaling the paging message.

As compared with the prior art, the wireless communication device, the wireless communication method, and the eNB according to the embodiments of this disclosure can achieve at least the following advantageous effect: the eNB can send the paging signaling to the wireless communication device to assist in D2D paging between the wireless communication devices to thereby improve the efficiency of paging by the wireless communication device and thus the efficiency of D2D communication.

The respective component modules and units in the devices above can be configured in software, firmware, hardware or any combination thereof. Particular configuration means or schemes available are well known to those skilled in the art, so a repeated description thereof will be omitted here. In the case of being embodied in software or firmware, a program constituting the software can be installed from a storage medium or a network to a computer with a dedicated hardware structure, where the computer can perform various functions, etc., when various programs are installed thereon.

In the case that the foregoing series of processes are performed in software, a program constituting the software can be installed from a network, e.g., the Internet, etc., or a storage medium, e.g., a removable medium, etc.

Those skilled in the art shall appreciate that the storage medium will not be limited to the removable medium in which the program is stored and which is distributed separately from the device to provide a user with the program. Examples of the removable medium include a magnetic disk (including a Floppy Disk (a registered trademark)), an optical disk (including Compact Disk-Read Only memory (CD-ROM) and a Digital Versatile Disk (DVD)), an optic-magnetic disk (including a Mini Disk (MD) (a registered trademark)) and a semiconductor memory. Alternatively the storage medium can be an ROM, a hard disk included in a storage portion, etc., in which the program is stored and which is distributed together with the device including the same to the user.

This disclosure further proposes a product program on which machine readable instruction codes are stored. The instruction codes can perform the method according to the embodiment of this disclosure upon being read and executed by a machine.

Correspondingly a storage medium carrying the program product above on which the machine readable instruction codes are stored will also be encompassed in this disclosure. The storage medium includes but will not be limited to a floppy disk, an optical disk, an optic-magnetic disk, a memory card, a memory stick, etc., Finally it shall be noted that such relationship terms in this disclosure as left and right, first and second, etc., are merely intended to distinguish one entity or operation from another entity or operation but not necessarily intended to require or suggest any such a real relationship or order between these entities or operations. Furthermore the terms "include", "comprise" and any variants thereof are intended to encompass nonexclusive inclusion so that a process, a method, an article or a device including a series of elements includes both those elements and one or more other elements which are not listed explicitly or one or more elements inherent to the process, the method, the article or the device. Unless stated otherwise, an element being defined in the sentence "include/comprise a(n) . . . " will not exclude the presence of one or more additional identical element in the process, the method, the article or the device including the element.

Although this disclosure has been disclosed above in the description of the particular embodiments of this disclosure, it shall be appreciated that those skilled in the art can devise various modifications, adaptations or equivalents to this disclosure without departing from the spirit and scope of the appended claims. These modifications, adaptations or equivalents shall also be regarded as falling into the claimed scope of this disclosure.

The invention claimed is:

1. A wireless communication device for device to device communication (D2D), the wireless communication device comprising:
   circuitry configured to
      initiate paging to another wireless communication device over a dedicated carrier based upon information about the dedicated carrier; and
      if the paging fails, continue the paging by extending a paging range of the wireless communication device and/or assisted by accessing a base station searing the wireless communication device; and
   a receiver configured to receive paging signaling to assist in the paging between the wireless communication device and another wireless communication device, wherein
   the circuitry sends the paging signaling when a predetermined condition of D2D communication is satisfied between the wireless communication device and the another wireless communication device, wherein
   the circuitry is further configured to determine, using the paging, a setup of the D2D communication between the wireless communication device and the another wireless communication device based upon whether the paging succeeds and, if the paging fails, upon the paging by extending the paging range.

2. The wireless communication device according to claim 1, wherein a paging message corresponding to the paging signaling comprises information selected from the group consisting of the information about the dedicated carrier for use in D2D communication, information about location areas of the wireless communication device and the another wireless communication device, and channel allocation information about a dedicated channel for D2D communication between the wireless communication device and the another wireless communication device, and combinations thereof.

3. The wireless communication device according to claim 1, wherein the paging signaling comprises at least a cross-carrier scheduling indicator to tune the wireless communication device and the another wireless communication device to the dedicated carrier, the dedicated carrier is set for D2D communication, the wireless communication device acquires information about the dedicated carrier of D2D communication from the cross-carrier scheduling indicator and demodulates according to the cross-carrier scheduling indicator to obtain a paging message corresponding to the paging signaling.

4. The wireless communication device according to claim 1, wherein the circuitry is configured to
   judge whether the paging by the wireless communication device succeeds, depending upon whether the wireless communication device receives a response to the paging sent by the wireless communication device from the another wireless communication device in a first predetermined period of time;
  judge that the paging by the wireless communication device succeeds if the wireless communication device receives the response from the another wireless communication device in the first predetermined period of time; and
  judge that the paging by the wireless communication device fails if the wireless communication device does not receive the response from the another wireless communication device in the first predetermined period of time.

5. The wireless communication device according to claim 1, wherein the circuitry is configured to page over a physical uplink control channel that is received and demodulated by the another wireless communication device to obtain the paging message corresponding to the paging initiated by the wireless communication device.

6. The wireless communication device according to claim 1, wherein the circuitry is configured, if the paging succeeds, to determine the setup of the D2D communication between the wireless communication device and the another wireless communication device according to a measurement result of the another wireless communication device on paging sent by the wireless communication device.

7. The wireless communication device according to claim 1, wherein the circuitry is configured to enable the wireless communication device to perform the D2D communication with the another wireless communication device over the dedicated carrier in a manner of reusing resources when the setup of the D2D communication between the wireless communication device and the another wireless communication device is determined.

8. The wireless communication device according to claim 2, wherein the circuitry is configured to extend the paging, range from a location area where the wireless communication device is located, to an entire location area covered by maximum power of the wireless communication device to continue with paging according to information about the location areas of the wireless communication device and the other wireless device, or to change a paging frequency band to continue with paging.

9. The wireless communication device according to claim 6, wherein the circuitry is configured to determine whether there is a damage to a link via a received signal if the D2D communication is set up between the wireless communication device and the another wireless communication device, and the damage to the link is determined for the D2D communication if there is occurring at least one of:
  (i) power of the received signal is below a first threshold;
  (ii) a failure ratio of data transmission is above a second threshold; and
  (iii) a probability that data are retransmitted is above a third threshold.

10. The wireless communication device according to claim 9, wherein the circuitry is configured to send a request for setting up communication connection between the wireless communication device and the another wireless communication device through a base station and to initiate paging to the another wireless communication device when the damage to the link for the D2D communication is determined, wherein if the circuitry pages successfully, then the circuitry is configured to resume the D2D communication between the wireless communication device and the another wireless communication device.

11. The wireless communication device according to claim 10, wherein a dual-link connection comprising communication connection which is set up through the base station and D2D connection between the wireless communication device and the another wireless communication device is set up through earner aggregation.

12. The wireless communication device according to claim 1, wherein the wireless communication device monitors paging ahead by a second predetermined period of time so that the wireless communication device receives paging in synchronization with sending of paging by the another wireless communication device.

13. A wireless communication method for device to device (D2D) communication, the wireless communication method comprising:
  initiating, by circuitry of an initiating device, paging to a target device over a dedicated carrier based upon information about the dedicated carrier;
  continuing, if the paging fails, the paging by extending a paging range of the initiating device and/or assisted by accessing a base station serving the initiating device;
  receiving, by the initiating device, paging signaling to assist in the paging between the initiating device and the target device;
  sending the paging signaling, if a predetermined condition of D2D communication is satisfied between the initiating device and the target device; and
  determining, by the circuitry using the paging, a setup of the D2D communication between the initiating device and the target device based upon whether the paging succeeds and, if the paging fails, upon the paging by extending the paging range.

14. The wireless communication method according to claim 13, wherein a paging message corresponding to the paging signaling comprises at least one of: the information about the dedicated carrier for use in D2D communication, information about location areas of the initiating device and the target device, and channel allocation information about a dedicated channel for D2D communication between the initiating device and the target device.

15. The wireless communication method according to claim 13, wherein the paging signaling comprises at least a cross-carrier scheduling indicator to tune the initiating device and the target device to the dedicated carrier which is set for D2D communication, and the initiating device and the target device know information about the dedicated carrier of D2D communication from the cross-carrier scheduling indicator, and demodulate according to the cross-carrier scheduling indicator to obtain a paging message corresponding to the paging signaling.

16. A base station, comprising:
  circuitry configured to determine whether a first communication device and a second communication device satisfy a predetermined condition of device to device (D2D) communication between the first communication device and the second communication device; and
  a transmitter configured to send paging signaling to the first and second communication devices to assist in paging between the first and second communication devices, if the circuitry determines that the predetermined condition is satisfied, wherein
  the circuitry uses the paging signaling to determine a setup of the D2D communication between the first and second communication devices based upon whether the paging succeeds and, if the paging fails, upon the paging by extending the paging range, the first communication device initiates the paging, between the first communication device and the second communication device, over a dedicated carrier based upon information about the dedicated carrier, and if the paging fails, the first communication device continues the paging by extending a paging range of the first communication device and/or assisted by accessing the base station.

17. The base station according to claim 16, wherein the circuitry is configured to determine whether the first and second communication devices satisfy the predetermined condition of D2D communication according to location area information of the first and second communication devices.

* * * * *